United States Patent Office 2,811,844
Patented Nov. 5, 1957

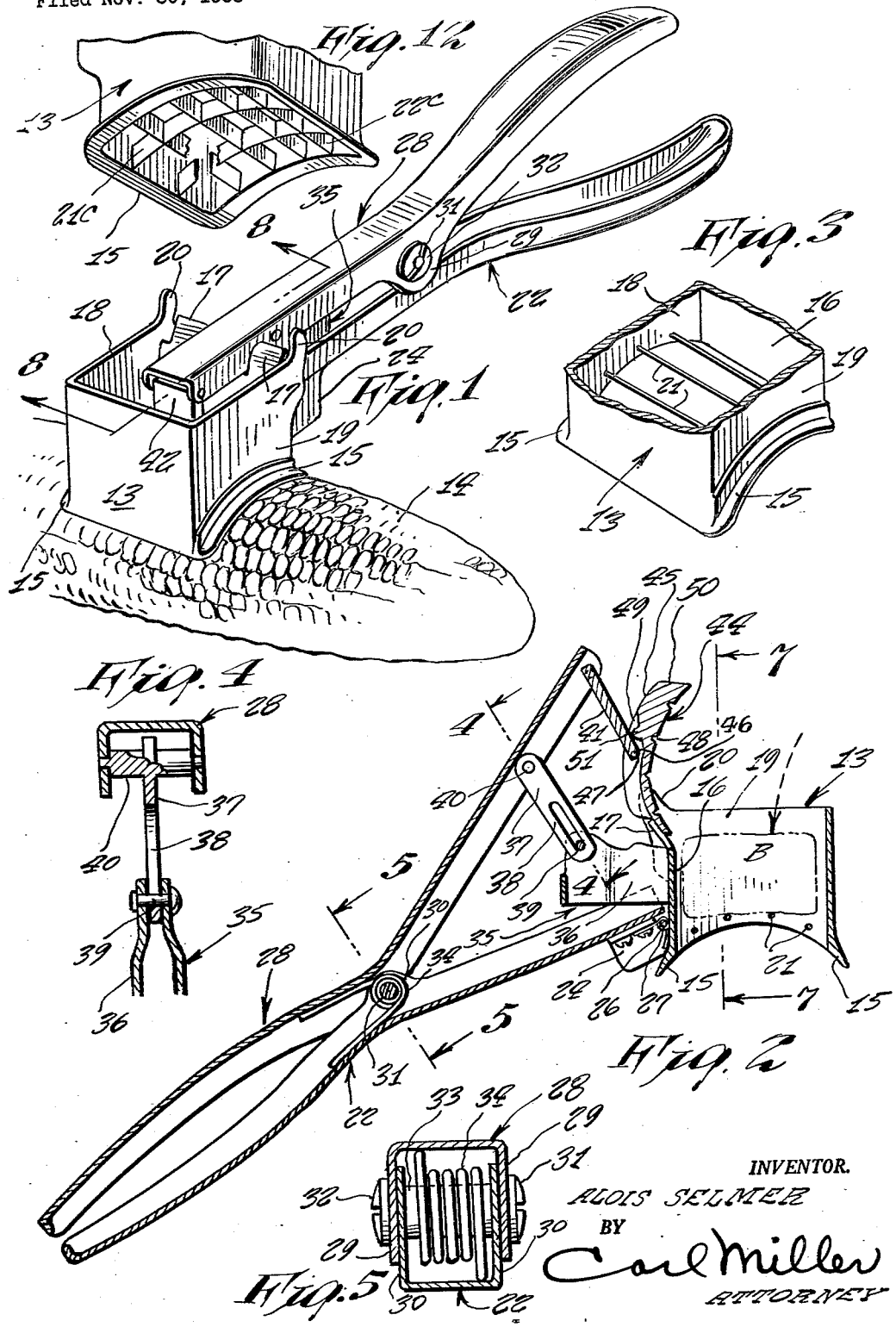

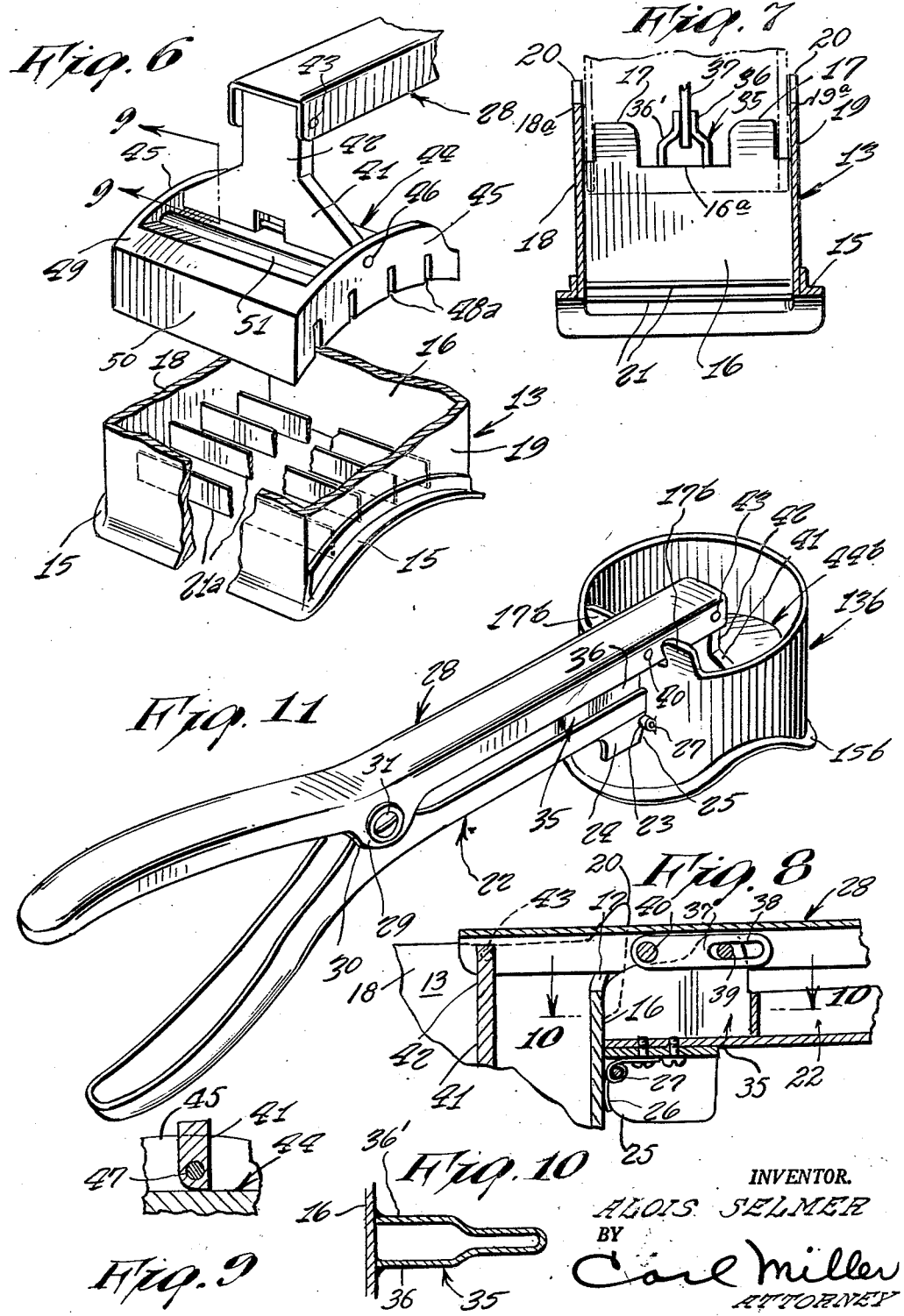

2,811,844

SWEET CORN BUTTER DEVICE

Alois Selmer, Bronx, N. Y.

Application November 30, 1953, Serial No. 395,029

11 Claims. (Cl. 65—12)

This invention relates to a device which will be used to butter an ear of corn.

It is an object of the present invention to provide a corn buttering device which will quickly and efficiently butter an ear of corn throughout its entire length without soiling the fingers or necessitating the employment of a knife of the like.

It is another object of the present invention to provide a corn buttering device which includes a butter pat receiving portion adapted to slide along the ear of corn longitudinally, the bottom of the butter receiving portion being provided with a grill in contact with the ear of corn and through which the butter is urged in a novel and controlled manner.

Other objects of the present invention are to provide a corn buttering device bearing the above objects in mind which is of simple construction, inexpensive to manufacture, has a minimum number of parts, is easy to use and efficient in operation.

For other objects and a better understanding of the invention, reference can be had to the following detailed description taken in connection with the accompanying drawings, in which:

Figure 1 is a perspective view showing the device in operative use on an ear of corn;

Fig. 2 is a longitudinal sectional view thereof but showing the device in an open, butter-receiving position;

Fig. 3 is a fragmentary perspective view of the butter receiving portion;

Fig. 4 is a transverse sectional view taken along the line 4—4 of Fig. 2;

Fig. 5 is a transverse sectional view taken along the line 5—5 of Fig. 2;

Fig. 6 is an exploded perspective fragmentary view of a modified form of the present invention;

Fig. 7 is a vertical sectional view taken along the line 7—7 of Fig. 2;

Fig. 8 is a longitudinal sectional view taken along the line 8—8 of Fig. 1;

Fig. 9 is a vertical sectional view taken along the line 9—9 of Fig. 6;

Fig. 10 is a fragmentary sectional view taken along the line 10—10 of Fig. 8;

Fig. 11 is a perspective view of a still further modified form of the present invention; and Fig. 12 is a bottom perspective view of a still further modified form of the present invention.

Referring now to the figures and more particularly to Figs. 1 through 5, and 7 through 10, there is shown a corn buttering device including a hollow butter receiving member 13 open at top and bottom and of square cross section whereby to receive therewithin a square or pat of butter snugly, the bottom of the member 13 being concave at the bottom and adapted to rest on a curved surface of an ear of corn 14. The bottom of portion 13 is also formed with a flange 15 which presents a curved surface adapted to rest on the ear of corn and facilitate the sliding therealong.

One wall 16 of the butter receiving portion 13 has its top edge 16a below the top edges 18a and 19a of the other adjacent walls 18 and 19, respectively (Fig. 7) and is integrally formed with a pair of inclined guides 17. The sides walls 18 and 19 of portion 13 are integrally formed with the wall 16 and have an upwardly extending guide 20 at each top edge 18a and 19a, respectively.

A plurality of parallel spaced wires 21 are mounted in the bottom of the portion 13 (Fig. 3) providing a grill on which the butter rests. These wires may vary from one to eight in number or more if desired.

An elongated handle 22 of substantially U-shaped cross section is pivotally connected to the rear face of the wall 16 by means of the hinge 23 (Fig. 11), the bottom of the handle 22 adjacent the member 13 being provided with a fitting having downwardly extending ears 24 and a forward edge 25 inclined to the end of the handle and adapted to abut the face of wall 16 whereby to limit the downward displacement of the handle to the position of Fig. 2. A spring 26 (Fig. 2) sleeves the pintle 27 intermediate the ears 24, one end of the spring 26 abutting the wall 16 and the other end the bottom of the fitting on the handle 22.

A cooperating handle 28 of substantially U-shaped cross section is integrally formed with ears 29 by means of which it cooperates with corresponding ears 30 formed in the handle 22 to receive therethrough the cooperating nut and bolt structure 31, 32 by means of which they are pivotally connected. A sleeve 33 is provided on bolt 32 intermediate the ears 30 and serves to receive the body portion of a spring 34 one end of which abuts the handle 22 and the other end of which abuts the handle 28 whereby to normally urge these handles to the position of Fig. 1.

A rearwardly extending bracket 35 (Fig. 10) is welded to the wall 16 and has its lowest portion of the side walls 36 and 36' freely received between the sides of the handle 22. The upper end of the bracket 35 is bifurcated and receives between its bifurcated ends a link 37. The link 37 is provided with an elongated slot 38 (Fig. 8) within which rides a pin 39 bridging the opposite sides of bracket 35. The other end of link 37 is pivotally connected to handles 28 (Fig. 4) by means of the pin 40.

A plate 41 is provided with a neck 42 adapted to be received between the sides of the handle 28 (Fig. 6), the neck 42 being pivotally connected thereto by means of the pin 43. An arcuate plate 44 is provided at each side with an integrally formed upwardly extending wall 45, the walls 45 receiving the opposite ends of the plate 41 therebetween and being pivotally connected thereto by means of a transverse pin 46 (Fig. 6). As shown in Fig. 9, one side of the bottom edge of the plate 41 is bevelled, as at 47, while the other side is squared, permitting the plate 44 to be rotated upwardly toward plate 41 on the side of the beveled portion 47 while limiting its displacement in the opposite direction, as will be obvious. The lower surface of the plate 44 is provided with transverse grooves 48 each of which is adapted to receive therewithin one of the transverse wires 21, the plate 44 normally resting on top of the pat or square of butter. The plate 44 at its forward edge is integrally formed with a thickened portion 49 which presents a planar surface 50. Thus, when the plate 44 is within the member 13 an edge of the planar portion 50 will abut the wall to aid the plate in its proper positioning therein. The plate 44 is provided with a stop 51 whereby to limit the rotation of the plate about the pin 46, as shown in Fig. 2. It will be noted that the ends of the side walls 45 remote from the planar surface 50 terminate short of the edge of the plate to provide a portion adapted to rest on the guides 17 when the handles 28 and 22 are squeezed together (Fig.

2) which retains the plate 44 in a substantially vertical open position.

In operation, the handle portions 22 and 28 are squeezed together, as shown in Fig. 2, to draw the plate 44 into the open vertical position whereupon the pat of butter B is inserted downwardly to rest on the grid formed by the transverse wires 21. The handle portions are then permitted to expand to the position of Fig. 1, gradually exerting a downward pressure on the butter B intermediate the grill 21 and the plate 44, meanwhile the user moves the portion 13 longitudinally back and forth along the ear of corn 14. Thus, it will be seen that the butter is urged downwardly through the grill by the spring action of spring 34 and also due to the heat of the ear of corn melting the butter.

Referring now particularly to Fig. 6, there is shown a modified form of the present invention wherein the wires 21 of the first form are replaced by blades 21a. The plate 44 is now provided with upwardly extending slots 48a adapted to receive the blades 21a upwardly therein. In other respects, the form of the invention, shown in Fig. 6, is the same as that shown in Figs. 1 through 5 and 7 through 10, and like reference numerals identify like parts throughout the several views.

Referring now particularly to Fig. 11, there is shown a still further modified form of the present invention wherein the device is now provided with a circular butter receiving portion 13b adapted to receive therewithin circular pats of butter. A corresponding circular plate 44b slides downwardly therewithin. The portion 13b is provided with a flange 15b adapted to abut the ear of corn, as well as the guides 17b. In other respects the form of the invention shown in Fig. 11 is the same as that shown in Figs. 1 through 5 and 7 through 10, and like reference numerals identify like parts throughout the several views.

Referring now particularly to Fig. 12, there is shown a still further modified form of the invention wherein a plurality of parallel spaced blades 21c and a plurality of parallel spaced blades 22c intersect at right angles, substantially as illustrated. In other respects the form of the invention shown in Fig. 12 is the same as that shown in Figs. 1 through 5 and 7 through 10 and like reference numerals identify like parts throughout the several views.

While various changes may be made in the detail construction, it shall be understood that such changes shall be within the spirit and scope of the present invention as defined by the appended claims.

Having thus set forth and disclosed the nature of my invention, what is claimed is:

1. A corn buttering device comprising a hollow butter receiving receptacle open at its upper and lower ends and having concaved lower edges conforming to the outer surface of an ear of corn, a plunger block slidably mounted within said receptacle, said plunger block having a lower concave surface, grill means provided at the bottom of said receptacle and presenting a convex supporting surface adapted to abut said plunger block, a pair of handles pivotally connected at their mid-points to each other, the jaw end of the lowermost of said handles being pivotally connected to said receptacle, a plate pivotally connected to the jaw end of the other of said handles, the lower edge of said plate being pivotally connected to the top of said plunger block, said plunger block being adapted to rotate about said plate toward said handle and limited against rotation in the opposite direction about said plate, a bracket rearwardly extending from said receptacle adapted to be received within the lowermost of said handle portions, a link slidably received between the sides of said bracket, the upper end of said link being pivotally connected to the uppermost of said handles, said link having an elongated slot, and a pin connected to the opposite sides of said bracket and passing through said link slot.

2. A corn buttering device according to claim 1, one of the walls of the said receptacle carrying the said rearwardly extending bracket and terminating below the upper edges of the other walls of the said receptacle, the said one of the walls having upwardly and rearwardly inclined guides, and said plunger block at one end lying flush against said guides when in an open position whereby to prevent rearward rotation of the same.

3. A corn buttering device according to claim 2, in which said plunger block has a forward planar surface slidably engaging the inner face of said receptacle whereby to guide said block to a horizontally aligned position.

4. A corn buttering device according to claim 3, including a spring urging the jaw ends of said handle portions together, said spring being located about the pivot of said handles, one end of said spring abutting one handle and the other end of said spring abutting the other handle.

5. A corn buttering device according to claim 4, the lowermost of said handles at the jaw end thereof having a pair of downwardly extending ears having inclined forward edges adapted to abut the adjacent face of said receptacle whereby to limit the downward movement of said lower handle relative to said receptacle.

6. A corn buttering device according to claim 5, the lower surface of said plunger block having recessed portions adapted to receive said grill means therewithin.

7. A corn buttering device according to claim 6, said receptacle being of substantially square cross section and having a flange along the lower edges thereof adapted to slidably abut the ear of corn.

8. A corn buttering device according to claim 7, said grill means comprising a plurality of transverse, longitudinally spaced wires secured at opposite ends to the sides of said receptacle, the undersurface of said block having transverse recesses adapted to receive said wires.

9. A corn buttering device according to claim 7, said grill means comprising a plurality of transverse, longitudinally spaced blades secured at opposite ends to the sides of said receptacle, said block on the undersurface thereof having recessed portions adapted to receive said blades therewithin.

10. A corn buttering device according to claim 7, said grill means comprising a plurality of transverse and longitudinal blades intersecting each other at substantially right angles and secured at opposite ends to the sides of said receptacle, said block on the undersurface thereof having recessed portions adapted to receive said intersecting blades therewithin.

11. A corn buttering device according to claim 6, said receptacle being substantially circular in cross section and being provided on the lower edge thereof with a flanged portion adapted to slidably abut the ear of corn.

References Cited in the file of this patent

UNITED STATES PATENTS

| Number | Name | Date |
|---|---|---|
| 92,703 | Chase | July 20, 1869 |
| 343,809 | Frary | June 15, 1886 |
| 515,277 | Blair | Feb. 20, 1894 |
| 853,796 | Imes et al. | May 14, 1907 |
| 1,213,655 | Keil | Jan. 23, 1917 |
| 1,317,667 | Schiemer | Sept. 30, 1919 |
| 1,727,465 | Hamilton | Sept. 10, 1929 |
| 1,893,889 | Guerini | Jan. 10, 1933 |
| 2,527,149 | Peterson | Oct. 24, 1950 |